UNITED STATES PATENT OFFICE.

WILLIAM H. DIBBLE, OF ELIZABETH, NEW JERSEY.

IMPROVEMENT IN COMPOSITION FOR MANUFACTURING MOLDED ARTICLES.

Specification forming part of Letters Patent No. 202,636, dated April 23, 1878; application filed March 17, 1877.

*To all whom it may concern:*

Be it known that I, WILLIAM H. DIBBLE, of Elizabeth, in the county of Union and State of New Jersey, have invented a new and useful Pulverulent Blood Composition or Compound, consisting of a certain preparation of said animal matter in combination with certain other matter, in form convenient for commerce, and ready for manufacturers' or other use, said compound being fully described in the following specification.

This invention relates to the preparation of ingredients more particularly used for making composite articles from such constituent particles under heat and pressure; and it consists in a composition formed by indurating and pulverizing the blood of animals as obtained from the abattoir, (either pure and in its natural state, or when dealbumenized or deprived of some one or more of its constituents,) in combination with the following-mentioned substances, said combination being prepared substantially in manner and proportion as follows:

In order to prepare this pulverulent compound, take about equal parts, by weight, when dried, of blood and either wood or coal ashes, finely-divided wood-fiber or cork, sand, common earth, powdered clay, slate, ivory, asbestus, plumbago, horns, bones, shells, charcoal, mineral coal, feldspar, gypsum, emery, flint, quartz or other stone, sulphur, metal filings, vegetable pulp or fiber, vegetable gums, glue, and refuse animal and vegetable solid substances.

Having selected any one or more of the said solid materials, such matter is first thoroughly dried, then ground to a powder, and then incorporated with the blood at any time before putrefaction begins, either by hand-stirring or by any suitable mixing-machine, until the mass assumes the consistency of mush. The mass so mixed can now be placed in a suitable vessel, and be subjected to a steam or hot-water bath until it assumes a brownish color, when it is removed from the bath, and thoroughly dried and indurated by either natural or artificial heat, and then ground, in a suitable machine, to a fine, dry powder, either for immediate use or for shipment in boxes or packages of suitable weight.

The powder thus prepared will retain its dry state under ordinary atmospheric conditions, and can be used at any time and place after preparation and shipment.

For the manufacture of some articles, the composition, of whatever substance or substances composed, may be only moistened with the blood before drying. Such articles, when finished by heat and pressure, will have a wood-like nature, while those made from pure blood, or by a more liberal mixture of blood, will have more of the characteristics of hard rubber.

The steam or hot-water bath above mentioned is not strictly necessary. The mass or composition may be dried by natural or artificial means as soon as mixed.

One field for the use of this pulverulent compound is in the fabrication of certain composite articles by a process already invented by me, (and to the said process I herein make no claim,) for the production of such articles as door-knobs, moldings, chair-seats, statuettes, and other ornamental figures, and for numerous other useful articles, formed by compression in molds or dies of suitable shape or pattern, heated to a temperature of from 200° to 500° Fahrenheit, depending upon the degree of hardness, polish, and solidity desired in the article to be produced.

I am aware that a mere mixture composed of blood and some of the above-mentioned substances is not new *per se;* but in none of the processes or compositions described or used has such mixture been made in nearly the same proportions; nor has such mixture been prepared in a manner capable of forming a permanently dry, indurated, pulverulent merchantable article, suitable for packing in convenient parcels ready for commercial use, and in perfect condition needed by the manufacturer.

All blood compositions heretofore prepared have either been in liquid form or in the form of a paste or dough, or else in crude, dry, coarse masses, more or less mixed with offal, and subject to putrefactive decay.

In the preparation of this pulverulent compound, it is desirable to dry *en masse* the mush composed of blood and powdered solids; but, if preferred, the blood and the powdered solids may be dried separately, and the powdered blood and the said solids be then mixed together in proportions suitable for the required article to be manufactured; but this latter method of combination is not considered so desirable as that first mentioned above, although it may be more convenient to dry and pulverize the blood in one locality, as at a large abattoir, and thence to ship the powdered blood for subsequent use, alone or in combination, as hereinbefore described.

The blood may be dried and fully prepared, either in its natural state or when deprived of its albumen, or some one or more of its constituents, as above mentioned, and when it is desired to combine woody or vegetable pulp or fiber with the blood, said fiber or pulp may be obtained from the wood by the process used in the preparation of wood-pulp for the manufacture of paper.

By the term "pure," as herein applied to the blood, is meant either the natural state of the blood as it is drawn from the animal, or any one or more of its constituents, when used alone, in contradistinction to the combination of the blood or any of its constituents with foreign matter.

Having thus fully described this composition of matter as of my invention, I claim—

A dry pulverulent composition of matter consisting of powdered blood and one or more of the hereinbefore-mentioned animal, vegetable, or mineral solids, the said composition forming a permanent powder for manufacturers' or other use, substantially as specified.

WM. H. DIBBLE.

Witnesses:
J. B. DRAKE,
GEO. J. MARTIN.